US012713359B2

(12) United States Patent
Liu et al.

(10) Patent No.: US 12,713,359 B2
(45) Date of Patent: Aug. 18, 2026

(54) MULTI-CARRIER COMMUNICATION CONTROL METHOD AND APPARATUS, AND COMMUNICATION DEVICE

(71) Applicant: VIVO MOBILE COMMUNICATION CO., LTD., Guangdong (CN)

(72) Inventors: Ziqi Liu, Guangdong (CN); Sanjun Feng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 320 days.

(21) Appl. No.: 18/433,634

(22) Filed: Feb. 6, 2024

(65) Prior Publication Data

US 2024/0179635 A1 May 30, 2024

Related U.S. Application Data

(63) Continuation of application No. PCT/CN2022/110408, filed on Aug. 5, 2022.

(30) Foreign Application Priority Data

Aug. 6, 2021 (CN) ......................... 202110904339.4

(51) Int. Cl.
*H04W 72/14* (2009.01)
*H04W 8/22* (2009.01)
(Continued)

(52) U.S. Cl.
CPC .......... *H04W 52/146* (2013.01); *H04W 8/22* (2013.01); *H04W 52/367* (2013.01); *H04W 52/42* (2013.01)

(58) Field of Classification Search
CPC ....... H04W 8/22; H04W 8/24; H04W 52/146; H04W 52/42; H04W 52/367;
(Continued)

(56) References Cited

U.S. PATENT DOCUMENTS

2017/0047973 A1* 2/2017 Wu ..................... H04B 7/0452
2020/0314765 A1 10/2020 Jung et al.
(Continued)

FOREIGN PATENT DOCUMENTS

CN 111507004 A * 8/2020 ................ H02J 1/00
CN 112584374 A 3/2021
(Continued)

OTHER PUBLICATIONS

Extended European Search Report for Application No. 22852322.1, dated Oct. 28, 2024, 11 Pages.
(Continued)

*Primary Examiner* — Phong La
(74) *Attorney, Agent, or Firm* — BROOKS KUSHMAN P.C.

(57) ABSTRACT

A multi-carrier communication control method and apparatus, and a communication device. The method includes: obtaining, by a network-side device, a capability of a maximum uplink sending time duty cycle that is supported by the terminal in each carrier frequency band and a capability of a maximum uplink sending time duty cycle that is supported by the terminal in a carrier frequency band combination corresponding to multiple carrier frequency bands; and adjusting, by the network-side device, an actual uplink sending time of the terminal in each carrier frequency band to obtain an actual uplink sending time duty cycle of the terminal in each carrier frequency band.

13 Claims, 5 Drawing Sheets

In a case that a terminal is in multi-carrier aggregation or a supplementary uplink, a network-side device obtains a capability of a maximum uplink sending time duty cycle that is supported by the terminal in each active carrier frequency band and a capability of a maximum uplink sending time duty cycle that is supported by the terminal in a carrier frequency band combination corresponding to multiple carrier frequency bands — 201

↓

The network-side device adjusts an actual uplink sending time of the terminal in each active carrier frequency band to obtain an actual uplink sending time duty cycle of the terminal in each active carrier frequency band, so that the actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy a preset relationship — 202

(51) Int. Cl.

| | |
|---|---|
| ***H04W 52/14*** | (2009.01) |
| ***H04W 52/36*** | (2009.01) |
| ***H04W 52/42*** | (2009.01) |

(58) Field of Classification Search

CPC ............ H04W 52/246; H04W 52/267; H04W 72/0473; H04L 5/001; H04L 5/0082; H04L 27/26; Y02D 30/70

See application file for complete search history.

(56) References Cited

U.S. PATENT DOCUMENTS

| | | | | |
|---|---|---|---|---|
| 2022/0022177 | A1* | 1/2022 | Xing | H04W 72/51 |
| 2022/0070870 | A1* | 3/2022 | Dinan | H04L 69/22 |
| 2022/0217648 | A1 | 7/2022 | Lin | |
| 2022/0248470 | A1* | 8/2022 | Kang | H04B 7/18543 |
| 2023/0028505 | A1 | 1/2023 | Okamura et al. | |
| 2024/0179635 | A1* | 5/2024 | Liu | H04W 8/22 |

FOREIGN PATENT DOCUMENTS

| | | | | |
|---|---|---|---|---|
| CN | 112887241 | A * | 6/2021 | H04L 27/2657 |
| JP | 2022549865 | A | 11/2022 | |
| WO | 2020047759 | A1 | 3/2020 | |
| WO | 2021029082 | A1 | 2/2021 | |
| WO | 2021057965 | A1 | 4/2021 | |
| WO | 2021100099 | A1 | 5/2021 | |

OTHER PUBLICATIONS

CATT "Discussion on SAR solutions of TDD intra-band contiguous UL CA" 3GPP TSG-RAN WG4 Meeting # 97-e, R4-2014392, Electronic Meeting, Nov. 2020, 3 Pages.

ZTE Corporation "Discussion on SAR solution for NR PC2 inter-band CA" 3GPP TS.G-RAN.WG4 Meeting # 97-e, Electronic Meeting, Nov. 2020, R4-2015040, 3 Pages.

International Search Report and Written Opinion for Application No. PCT/CN2022/110408, dated Nov. 2, 2022, 14 Pages.

China Telecom "Discussion on SAR schemes for UE power class 2 NR inter-band CA with 2UL" 3GPP TSG-RAN WG4 Meetin # 98-bis-e, Electronic Meeting, Apr. 2021, R4-2106275, 2 Pages.

First Office Action for Japanese Application No. 2024-506652, dated Jan. 15, 2025, 10 Pages.

China Telecom. Discussion on SAR schemes and band combination requirements for UE power class 2 NR inter-band CA with 2UL: 3GPP TSG-RAN WG4 Meeting #97-e. R4-2015190. Online. Nov. 2020. 6 pages.

First Korean Office Action for Korean Patent Application No. 10-2024-7007482 mailed Apr. 27, 2026. 12 pages.

* cited by examiner

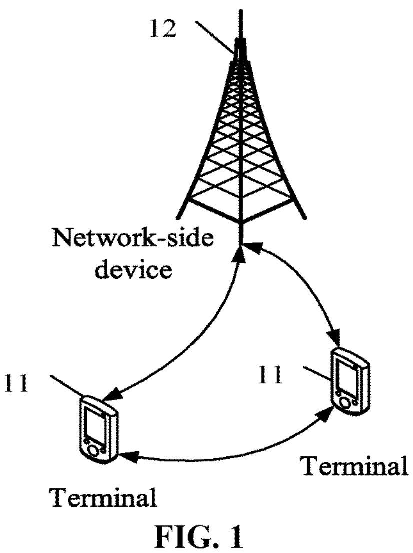

FIG. 1

In a case that a terminal is in multi-carrier aggregation or a supplementary uplink, a network-side device obtains a capability of a maximum uplink sending time duty cycle that is supported by the terminal in each active carrier frequency band and a capability of a maximum uplink sending time duty cycle that is supported by the terminal in a carrier frequency band combination corresponding to multiple carrier frequency bands — 201

↓

The network-side device adjusts an actual uplink sending time of the terminal in each active carrier frequency band to obtain an actual uplink sending time duty cycle of the terminal in each active carrier frequency band, so that the actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy a preset relationship — 202

FIG. 2

In a case that a terminal is in multi-carrier aggregation or a supplementary uplink, the terminal reports, to a network-side device, a capability of a maximum uplink sending time duty cycle that is supported by the terminal in each active carrier frequency band and a capability of a maximum uplink sending time duty cycle that is supported by the terminal in a carrier frequency band combination corresponding to multiple carrier frequency bands

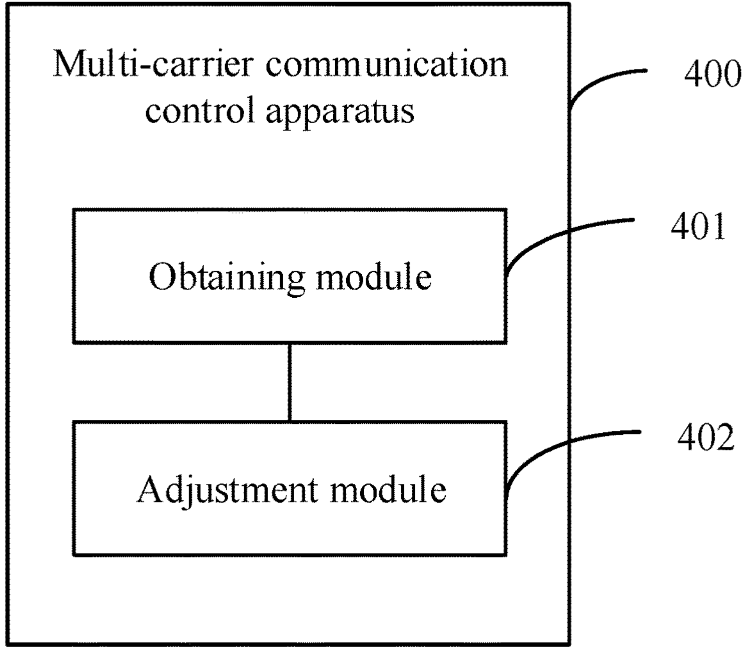

FIG. 4

MULTI-CARRIER COMMUNICATION CONTROL METHOD AND APPARATUS, AND COMMUNICATION DEVICE

CROSS-REFERENCE TO RELATED APPLICATIONS

This application is a continuation of International Application No. PCT/CN2022/110408 filed on Aug. 5, 2022, which claims priority to Chinese Patent Application No. 202110904339.4 filed on Aug. 6, 2021, which are incorporated herein by reference in their entireties.

TECHNICAL FIELD

This application pertains to the field of communications technologies, and specifically, relates to a multi-carrier communication control method and apparatus, and a communication device.

BACKGROUND

Currently, in mobile communication, coverage is usually enhanced by reducing an uplink sending time duty cycle and using high power for sending within an effective data transmission time. In addition, it is necessary to ensure that overall radiation of a terminal measured according to a period does not exceed a standard. Under a multi-carrier aggregation condition, the terminal can perform simultaneous transmission on multiple carriers. However, how to ensure that overall radiation does not exceed the standard when the terminal performs simultaneous transmission in multiple carrier frequency bands is a problem that needs to be resolved currently.

SUMMARY

According to a first aspect, a multi-carrier communication control method is provided and includes:

in a case that a terminal is in multi-carrier aggregation or a supplementary uplink, obtaining, by a network-side device, a capability of a maximum uplink sending time duty cycle that is supported by the terminal in each active carrier frequency band and a capability of a maximum uplink sending time duty cycle that is supported by the terminal in a carrier frequency band combination corresponding to multiple carrier frequency bands; and adjusting, by the network-side device, an actual uplink sending time of the terminal in each active carrier frequency band to obtain an actual uplink sending time duty cycle of the terminal in each active carrier frequency band, so that the actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy a preset relationship.

According to a second aspect, a multi-carrier communication control method is provided and includes:

in a case that a terminal is in multi-carrier aggregation or a supplementary uplink, reporting, by the terminal to a network-side device, a capability of a maximum uplink sending time duty cycle that is supported by the terminal in each active carrier frequency band and a capability of a maximum uplink sending time duty cycle that is supported by the terminal in a carrier frequency band combination corresponding to multiple carrier frequency bands, where an actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy a preset relationship.

According to a third aspect, a multi-carrier communication control apparatus is provided and includes:

an obtaining module, configured to: in a case that a terminal is in multi-carrier aggregation or a supplementary uplink, obtain a capability of a maximum uplink sending time duty cycle that is supported by the terminal in each active carrier frequency band and a capability of a maximum uplink sending time duty cycle that is supported by the terminal in a carrier frequency band combination corresponding to multiple carrier frequency bands; and an adjustment module, configured to adjust an actual uplink sending time of the terminal in each active carrier frequency band to obtain an actual uplink sending time duty cycle of the terminal in each active carrier frequency band, so that the actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy a preset relationship.

According to a fourth aspect, a multi-carrier communication control apparatus is provided and includes:

a reporting module, configured to: in a case that the apparatus is in multi-carrier aggregation or a supplementary uplink, report, to a network-side device, a capability of a maximum uplink sending time duty cycle that is supported by the apparatus in each active carrier frequency band and a capability of a maximum uplink sending time duty cycle that is supported by the apparatus in a carrier frequency band combination corresponding to multiple carrier frequency bands, where an actual uplink sending time duty cycle of the apparatus in each active carrier frequency band, the capability of the maximum uplink sending time duty cycle that is supported by the apparatus in each active carrier frequency band, and the capability of the maximum uplink sending time duty cycle that is supported by the apparatus in the carrier frequency band combination corresponding to the multiple carrier frequency bands satisfy a preset relationship.

According to a fifth aspect, a network-side device is provided. The network-side device includes a processor, a memory, and a program or instructions stored in the memory and capable of running on the processor. When the program or instructions are executed by the processor, the steps of the method according to the first aspect are implemented.

According to a sixth aspect, a network-side device is provided and includes a processor and a communication interface. The processor is configured to:

in a case that a terminal is in multi-carrier aggregation or a supplementary uplink, obtain a capability of a maximum uplink sending time duty cycle that is supported by the terminal in each active carrier frequency band and a capability of a maximum uplink sending time duty cycle that is supported by the terminal in a carrier frequency band combination corresponding to multiple carrier frequency bands; and adjust an actual uplink sending time of the terminal in each active carrier frequency band to obtain an actual uplink sending time duty cycle of the terminal in each active carrier frequency band, so that the actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy a preset relationship.

According to a seventh aspect, a terminal is provided. The terminal includes a processor, a memory, and a program or instructions stored in the memory and capable of running on the processor. When the program or instructions are executed by the processor, the steps of the method according to the second aspect are implemented.

According to an eighth aspect, a terminal is provided and includes a processor and a communication interface. The communication interface is configured to: in a case that the terminal is in multi-carrier aggregation or a supplementary uplink, report, to a network-side device, a capability of a maximum uplink sending time duty cycle that is supported by the terminal in each active carrier frequency band and a capability of a maximum uplink sending time duty cycle that is supported by the terminal in a carrier frequency band combination corresponding to multiple carrier frequency bands, where an actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy a preset relationship.

According to a ninth aspect, a readable storage medium is provided. The readable storage medium stores a program or instructions. When the program or instructions are executed by a processor, the steps of the multi-carrier communication control method according to the first aspect are implemented, or the steps of the multi-carrier communication control method according to the second aspect are implemented.

According to a tenth aspect, a chip is provided. The chip includes a processor and a communication interface. The communication interface is coupled to the processor. The processor is configured to run a program or instructions to implement the multi-carrier communication control method according to the first aspect or implement the multi-carrier communication control method according to the second aspect.

According to an eleventh aspect, a computer program or program product is provided. The computer program or program product is stored in a non-transitory storage medium. The computer program or program product is executed by at least one processor to implement the steps of the multi-carrier communication control method according to the first aspect or implement the steps of the multi-carrier communication control method according to the second aspect.

BRIEF DESCRIPTION OF DRAWINGS

FIG. 1 is a block diagram of a wireless communications system to which an embodiment of this application may be applied;

FIG. 2 is a flowchart of a multi-carrier communication control method according to an embodiment of this application;

FIG. 3 is a flowchart of another multi-carrier communication control method according to an embodiment of this application;

FIG. 4 is a structural diagram of a multi-carrier communication control apparatus according to an embodiment of this application;

DETAILED DESCRIPTION

Figure 5:
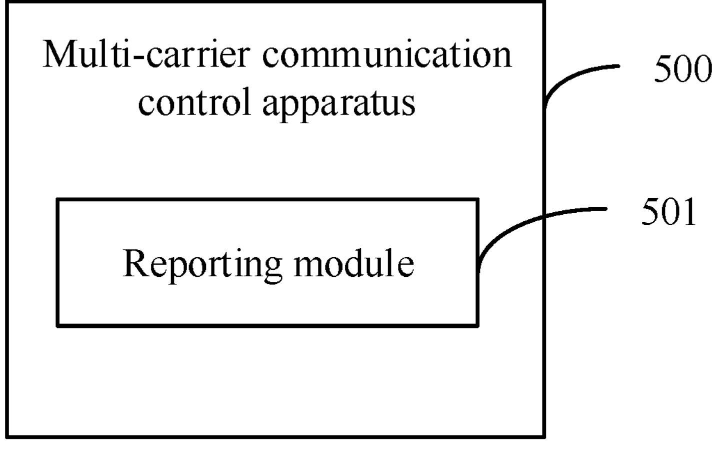
FIG. 5 is a structural diagram of another multi-carrier communication control apparatus according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the new radio (NR) system is described for an illustrative purpose, and NR terms are used in most of the following descriptions. These technologies may also be applied to other applications than an NR system application, for example, a 6th Generation (6G) communications system.

FIG. 1 is a block diagram of a wireless communications system to which an embodiment of this application may be applied. The wireless communications system includes a terminal 11 and a network-side device 12. The terminal 11 may also be referred to as a terminal device or user equipment (UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), an augmented reality (AR) or virtual reality (VR) device, a robot, a wearable device, a vehicular user equipment (VUE), a pedestrian user equipment (PUE), or a smart home (a home device having a wireless communication function, such as a refrigerator, a television, a washing machine, or furniture). The wearable device includes a smartwatch, a smart band, a smart headphone, smart glasses, smart jewelry (a smart bracelet, a smart wrist chain, a smart ring, a smart necklace, a smart anklet, a smart ankle chain, or the like), a smart wristband, smart clothing, a game console, or the like. It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (Basic Service Set, BSS), an extended service set (Extended Service Set, ESS), a NodeB, an evolved NodeB (eNB), a home NodeB, a home evolved NodeB, a wireless local area network (WLAN) access point, a Wi-Fi node, a transmission and reception point (TRP), or another appropriate term in the art, as long as the same technical effect is achieved. The base station is not limited to specific technical terms. It should be noted that in the embodiments of this application, only a base station in an NR system is used as an example, but a specific type of the base station is not limited.

A multi-carrier communication control method and apparatus, and a communication device provided in embodiments of this application are hereinafter described in detail by using some embodiments and application scenarios thereof with reference to the accompanying drawings.

FIG. 2 is a flowchart of a multi-carrier communication control method according to an embodiment of this application. The multi-carrier communication control method is applied to a network-side device. As shown in FIG. 2, the multi-carrier communication control method includes the following steps.

Step 201: In a case that a terminal is in multi-carrier aggregation or a supplementary uplink, a network-side device obtains a capability of a maximum uplink sending time duty cycle that is supported by the terminal in each active carrier frequency band and a capability of a maximum uplink sending time duty cycle that is supported by the terminal in a carrier frequency band combination corresponding to multiple carrier frequency bands.

It should be noted that, that the terminal is in multi-carrier aggregation means that the terminal can perform simultaneous transmission in at least two carrier frequency bands; and the active carrier frequency band is a carrier frequency band in which the terminal can perform resource scheduling. A power class of the terminal in each active carrier frequency band and the maximum uplink sending time duty cycle that is supported by the terminal in each active carrier frequency band are not the same. Based on the power class of the terminal in each active carrier frequency band, the terminal can report the capability of the maximum uplink sending time duty cycle that is supported by the terminal in the carrier frequency band combination corresponding to the multiple carrier frequency bands and report the capability of the maximum uplink sending time duty cycle that is supported by the terminal in each active carrier frequency band. In this way, the network-side device can obtain the foregoing parameters reported by the terminal.

Step 202: The network-side device adjusts an actual uplink sending time of the terminal in each active carrier frequency band to obtain an actual uplink sending time duty cycle of the terminal in each active carrier frequency band, so that the actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy a preset relationship.

It should be noted that after transmit power of the terminal corresponding to the active carrier frequency band is determined, two parameters, that is, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands, may be considered as two definite values. However, the actual uplink sending time duty cycle of the terminal in each active carrier frequency band is determined based on a signal sending status of the terminal, that is, it is not a definite value.

In this embodiment of this application, the network-side device can adjust the actual uplink sending time of the terminal in each active carrier frequency band to obtain the actual uplink sending time duty cycle of the terminal in each active carrier frequency band, so that the actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy the preset relationship, thereby ensuring that overall radiation of the terminal does not exceed a standard. The overall radiation of the terminal may be represented by a specific absorption ratio (SAR) and a maximum permissible exposure (MPE). For example, in a case that the preset relationship is satisfied, the SAR of the terminal does not exceed a preset SAR threshold, or the MPE of the terminal does not exceed a preset MPE threshold. In this way, in a case that the terminal is in the multi-carrier aggregation, overall radiation does not exceed the standard when the terminal performs simultaneous transmission in the multiple active carrier frequency bands. Therefore, damage to a user due to excessive radiation can be avoided, and user experience of the terminal can be improved.

Optionally, the terminal in this embodiment of this application is a terminal whose transmit power is higher than preset power. The preset power may be 23 dBm. In mobile communication, a plurality of power classes such as 23 dBm, 26 dBm, 29 dBm, and 31 dBm are defined for power of a terminal. In some implementation scenarios, a terminal whose transmit power is higher than 23 dBm may also be referred to as a high-power terminal.

In some embodiments, in a case that maximum transmit power supported by a target active carrier frequency band is higher than preset power, a capability of a maximum uplink sending time duty cycle that is supported by the terminal in the target active carrier frequency band is a first preset value; or in a case that maximum transmit power supported by a target active carrier frequency band is lower than or equal to preset power, a capability of a maximum uplink sending time duty cycle that is supported by the terminal in the target active carrier frequency band is a second preset value, where the target active carrier frequency band is any one of active carrier frequency bands corresponding to the multi-carrier aggregation.

Optionally, the preset power may be 23 dBm. When the maximum transmit power in the active carrier frequency band is higher than 23 dBm, the capability of the maximum uplink sending time duty cycle that is supported in the active carrier frequency band is the first preset value. When the maximum transmit power in the active carrier frequency band is lower than or equal to 23 dBm, the capability of the maximum uplink sending time duty cycle that is supported in the active carrier frequency band is the second preset value. The first preset value may be 0.5, and the second preset value may be 1. Certainly, the first preset value may alternatively be another value, and the second preset value may alternatively be another value. This is not specifically limited in this embodiment of this application.

For example, if the maximum transmit power in the active carrier frequency band is 26 dBm, the capability of the maximum uplink sending time duty cycle that is supported in the active carrier frequency band may be 0.5.

Optionally, in this embodiment of this application, in a case that the terminal does not report the capability of the maximum uplink sending time duty cycle that is supported by the terminal in the carrier frequency band combination corresponding to the multiple carrier frequency bands, the capability of the maximum uplink sending time duty cycle that is supported by the terminal in the carrier frequency band combination corresponding to the multiple carrier frequency bands is a first default value; or in a case that maximum transmit power supported in the active carrier frequency band is lower than or equal to preset power, the terminal does not report the capability of the maximum uplink sending time duty cycle that is supported by the terminal in the carrier frequency band combination corresponding to the multiple carrier frequency bands, and the capability of the maximum uplink sending time duty cycle that is supported by the terminal in the carrier frequency band combination corresponding to the multiple carrier frequency bands is a second default value.

In a case that the maximum transmit power supported in the active carrier frequency band is higher than the preset power, the terminal reports the capability of the maximum uplink sending time duty cycle that is supported by the terminal in the carrier frequency band combination corresponding to the multiple carrier frequency bands, and a value of this parameter is within a range of 0 to 1. The preset power may be 23 dBm. For example, the maximum transmit power supported by the terminal in the active carrier frequency band is 26 dBm. If the terminal does not report the capability of the maximum uplink sending time duty cycle that is supported in the carrier frequency band combination corresponding to the multiple carrier frequency bands, the capability of the maximum uplink sending time duty cycle that is supported by the terminal in the carrier frequency band combination corresponding to the multiple carrier frequency bands is the first default value by default. For example, the first default value is 0.5. Certainly, the first default value may alternatively be another value within the range of 0 to 1. This is not specifically limited in this embodiment of this application.

In a case that the maximum transmit power supported in the active carrier frequency band is lower than or equal to the preset power, for example, if the maximum transmit power supported by the terminal in the active carrier frequency band is 23 dBm, the terminal does not need to report the capability of the maximum uplink sending time duty cycle that is supported by the terminal in the carrier frequency band combination corresponding to the multiple carrier frequency bands, and the value of this parameter is the second default value by default. For example, the second default value is 1. The second default value may alternatively be another value. This is not specifically limited in this embodiment of this application.

It should be noted that, that the actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy the preset relationship may be: a ratio of the actual uplink sending time duty cycle of the terminal in each active carrier frequency band to the capability of the maximum uplink sending time duty cycle that is supported by the terminal in each active carrier frequency band is less than the capability of the maximum uplink sending time duty cycle that is supported by the terminal in the carrier frequency band combination corresponding to the multiple carrier frequency bands.

In this embodiment of this application, the preset relationship is:

$$\frac{1}{n}\times\left(\frac{\text{duty}_{x1}}{dutycycle_{x1}}+\frac{\text{duty}_{x2}}{dutycycle_{x2}}+\ldots+\frac{\text{duty}_{xn}}{dutycycle_{xn}}\right)\leq \text{CA\_dutycycle},$$

where n is the number of active carrier frequency bands, xn is an $n^{th}$ active carrier frequency band, $\text{duty}_{xn}$ is an actual uplink sending time duty cycle of the terminal in the $n^{th}$ active carrier frequency band, $\text{dutycycle}_{xn}$ is a capability of a maximum uplink sending time duty cycle that is supported by the terminal in the $n^{th}$ active carrier frequency band, and CA_dutycycle is the capability of the maximum uplink sending time duty cycle that is supported by the terminal in the carrier frequency band combination corresponding to the multiple carrier frequency bands.

For better understanding, the solution provided in this embodiment of this application is hereinafter described by using several specific implementations.

Implementation 1

When the terminal is in two-carrier aggregation, the terminal can perform simultaneous transmission in two active carrier frequency bands, that is, the number of active carrier frequency bands of the terminal is 2 (n=2). In this case, the preset relationship may be expressed by using the following formula:

$$\frac{1}{2}\times\left(\frac{\text{duty}_{x1}}{dutycycle_{x1}}+\frac{\text{duty}_{sul}}{dutycycle_{sul}}\right)\leq \text{CA\_dutycycle},$$

where $\text{duty}_{x1}$ is an actual uplink sending time duty cycle of the terminal in a first active carrier frequency band x1, dutycycleis a capability of a maximum uplink sending time duty cycle that is supported by the terminal in the first active carrier frequency band x1, $\text{duty}_{x2}$ is an actual uplink sending time duty cycle of the terminal in a second active carrier frequency band x2, $\text{dutycycle}_{x2}$ is a capability of a maximum uplink sending time duty cycle that is supported by the terminal in the second active carrier frequency band x2, and CA_dutycycle is a capability of a maximum uplink sending time duty cycle that is supported by the terminal in a carrier frequency band combination corresponding to the two carrier frequency bands.

In this implementation, the network-side device can adjust an actual uplink sending time of the terminal in the active carrier frequency band x1 and an actual uplink sending time of the terminal in the active carrier frequency band x2 separately to obtain the actual uplink sending time duty cycles $\text{duty}_{x1}$ and $\text{duty}_{x2}$ of the terminal in the two active carrier frequency bands respectively, so that after calculation by using the foregoing formula, the actual uplink sending time duty cycles of the terminal in the two carrier frequency bands are less than or equal to CA_dutycycle, thereby ensuring that overall radiation does not exceed the standard when the terminal performs simultaneous transmission in the two active carrier frequency bands.

Implementation 2

When the terminal is in the supplementary uplink (SUL), maximum transmit power supported by the terminal in the SUL is 23 dBm by default, and a capability $\text{dutycycle}_{sul}$ of a maximum uplink sending time duty cycle that is supported by the terminal in this link is 1.

In addition, the terminal can perform transmission in a new radio (New Radio, NR) carrier frequency band, that is, the terminal can perform simultaneous transmission in two active carrier frequency bands (NR and SUL carrier frequency bands), and the number of active carrier frequency bands of the terminal is 2 (n=2). In this case, the preset relationship may be expressed by using the following formula:

$$\frac{1}{2}\times\left(\frac{\text{duty}_{x1}}{dutycycle_{x1}}+\frac{\text{duty}_{sul}}{dutycycle_{sul}}\right)\leq \text{CA\_dutycycle},$$

where $\text{duty}_{x1}$ is an actual uplink sending time duty cycle of the terminal in the NR carrier frequency band, $\text{dutycycle}_{x1}$ is a capability of a maximum uplink sending time duty cycle that is supported by the terminal in the NR carrier frequency band, $\text{duty}_{sul}$ is an actual uplink sending time duty cycle of the terminal in the supplementary uplink SUL, $\text{dutycycle}_{sul}$ is a capability of a maximum uplink sending time duty cycle that is supported by the terminal in the supplementary uplink SUL, and CA_dutycycle is a capability of a maximum uplink sending time duty cycle that is supported by the terminal in a carrier frequency band combination corresponding to the NR and SUL carrier frequency bands.

In this implementation, the network-side device can adjust an actual uplink sending time of the terminal in the NR carrier frequency band and an actual uplink sending time of the terminal in the SUL carrier frequency band separately to obtain the actual uplink sending time duty cycles $\text{duty}_{x1}$ and $\text{duty}_{sul}$ of the terminal in the two carrier frequency bands respectively, so that after calculation by using the foregoing formula, the actual uplink sending time duty cycles of the terminal in the two carrier frequency bands are less than or equal to CA_dutycycle, thereby ensuring that overall radiation does not exceed the standard when the terminal performs simultaneous transmission in the two carrier frequency bands.

Implementation 3

When the terminal is in three-carrier aggregation, the terminal can perform simultaneous transmission in three active carrier frequency bands, that is, the number of active carrier frequency bands of the terminal is 3 (n=3). In this case, the preset relationship may be expressed by using the following formula:

$$\frac{1}{3}\times\left(\frac{\text{duty}_{x1}}{dutycycle_{x1}}+\frac{\text{duty}_{x2}}{dutycycle_{x2}}+\frac{\text{duty}_{x3}}{dutycycle_{x3}}\right)\leq \text{CA\_dutycycle},$$

where $\text{duty}_{x1}$ is an actual uplink sending time duty cycle of the terminal in a first active carrier frequency band x1, $\text{dutycycle}_{x1}$ is a capability of a maximum uplink sending time duty cycle that is supported by the terminal in the first active carrier frequency band x1, $\text{duty}_{x2}$ is an actual uplink sending time duty cycle of the terminal in a second active carrier frequency band x2, $\text{dutycycle}_{x2}$ is a capability of a maximum uplink sending time duty cycle that is supported by the terminal in the second active carrier frequency band x2, $\text{duty}_{x3}$ is an actual uplink sending time duty cycle of the terminal in a third active carrier frequency band x3, $\text{dutycycle}_{x3}$ is a capability of a maximum uplink sending time duty cycle that is supported by the terminal in the third active carrier frequency band x3, and CA_dutycycle is a capability of a maximum uplink sending time duty cycle that is supported by the terminal in a carrier frequency band combination corresponding to the three carrier frequency bands.

In this implementation, the network-side device can adjust an actual uplink sending time of the terminal in the active carrier frequency band x1, an actual uplink sending time of the terminal in the active carrier frequency band x2, and an actual uplink sending time of the terminal in the active carrier frequency band x3 separately to obtain the actual uplink sending time duty cycles $\text{duty}_{x1}$, $\text{duty}_{x2}$, and $duty_{x3}$ of the terminal in the three active carrier frequency bands respectively, so that after calculation by using the foregoing formula, the actual uplink sending time duty cycles of the terminal in the three carrier frequency bands are less than or equal to CA_dutycycle, thereby ensuring that overall radiation does not exceed the standard when the terminal performs simultaneous transmission in the three active carrier frequency bands.

Implementation 4

When the terminal is in n-carrier aggregation, the terminal can perform simultaneous transmission in n active carrier frequency bands, that is, the number of active carrier frequency bands of the terminal is n (n≥2). In this case, the preset relationship may be expressed by using the following formula:

$$\frac{1}{n}\times\left(\frac{duty_{x1}}{dutycycle_{x1}}+\frac{duty_{x2}}{dutycycle_{x2}}+\ldots+\frac{duty_{xn}}{dutycycle_{xn}}\right)\leq \text{CA\_dutycycle},$$

where n the number of active carrier frequency bands, $duty_{x1}$ is an actual uplink sending time duty cycle of the terminal in a first active carrier frequency band x1, $dutycycle_{x1}$ is a capability of a maximum uplink sending time duty cycle that is supported by the terminal in the first active carrier frequency band x1, $duty_{x2}$ is an actual uplink sending time duty cycle of the terminal in a second active carrier frequency band x2, $dutycycle_{x2}$ is a capability of a maximum uplink sending time duty cycle that is supported by the terminal in the second active carrier frequency band x2, $duty_{xn}$ is an actual uplink sending time duty cycle of the terminal in an $n^{th}$ active carrier frequency band xn, $dutycycle_{xn}$ is a capability of a maximum uplink sending time duty cycle that is supported by the terminal in the $n^{th}$ active carrier frequency band xn, and CA_dutycycle is a capability of a maximum uplink sending time duty cycle that is supported by the terminal in a carrier frequency band combination corresponding to the n carrier frequency bands.

It should be noted that, for a single active carrier frequency band, such as x1, if maximum transmit power supported by the terminal in the active carrier frequency band x1 is 26 dBm, and a supported maximum uplink duty cycle reported by the terminal is maxUplinkDutyCycle-PC2-FR1, the capability of the maximum uplink sending time duty cycle that is supported in the active carrier frequency band is $dutycycle_{x1}$=maxUplinkDutyCycle-PC2-FR1.

For a single active carrier frequency band, such as x2, if maximum transmit power supported by the terminal in the active carrier frequency band x2 is 29 dBm, and a supported maximum uplink duty cycle reported by the terminal is maxUplinkDutyCycle-PC2-FR1, but a maximum uplink duty cycle actually supported by the terminal is maxUplinkDutyCycle-PC2-FR1×0.5, the capability of the maximum uplink sending time duty cycle that is supported in the active carrier frequency band is $dutycycle_{x2}$=maxUplinkDutyCycle-PC2-FR1×0.5.

In this implementation, the network-side device can adjust an actual uplink sending time of the terminal in each of the n active carrier frequency bands to obtain the actual uplink sending time duty cycles $duty_{x1}$, $duty_{x2}$, . . . , $duty_{xn}$ of the terminal in the active carrier frequency bands respectively, so that after calculation by using the foregoing formula, the actual uplink sending time duty cycles of the terminal in the n carrier frequency bands are less than or equal to CA_dutycycle, thereby ensuring that overall radiation does not exceed the standard when the terminal performs simultaneous transmission in the n active carrier frequency bands.

FIG. 3 is a flowchart of another multi-carrier communication control method according to an embodiment of this application. The multi-carrier communication control method is applied to a terminal. As shown in FIG. 3, the multi-carrier communication control method includes the following step.

Step 301: In a case that a terminal is in multi-carrier aggregation or a supplementary uplink, the terminal reports, to a network-side device, a capability of a maximum uplink sending time duty cycle that is supported by the terminal in each active carrier frequency band and a capability of a maximum uplink sending time duty cycle that is supported by the terminal in a carrier frequency band combination corresponding to multiple carrier frequency bands.

An actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy a preset relationship.

In this embodiment of this application, in a case that the terminal is in the multi-carrier aggregation, the terminal reports, to the network-side device, the capability of the maximum uplink sending time duty cycle that is supported by the terminal in each active carrier frequency band and the capability of the maximum uplink sending time duty cycle that is supported by the terminal in the carrier frequency band combination corresponding to the multiple carrier frequency bands; and after the network-side device receives the two parameters reported by the terminal, the network-side device can adjust the actual uplink sending time of the terminal in each active carrier frequency band to obtain the actual uplink sending time duty cycle of the terminal in each active carrier frequency band, so that the actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy the preset relationship. Therefore, when the terminal performs simultaneous transmission in the multiple active carrier frequency bands, overall radiation does not exceed a standard, and damage to a user due to excessive radiation of the terminal is avoided.

Optionally, in a case that the actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands do not satisfy the preset relationship, the terminal reduces transmit power in the active carrier frequency band.

In this embodiment of this application, if the foregoing parameters of the terminal do not satisfy the preset relationship, the terminal reduces the transmit power in the active carrier frequency band. It may be understood that, as the transmit power in the active carrier frequency band is reduced, the actual uplink sending time duty cycle in the active carrier frequency band may also be reduced. Alternatively, the terminal reduces the actual transmit power in the active carrier frequency band, so that the actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands do not satisfy the preset relationship, thereby ensuring that overall radiation does not exceed the standard when the terminal performs simultaneous transmission in the multiple active carrier frequency bands.

In some embodiments, the preset relationship is:

$$\frac{1}{n}\times\left(\frac{\text{duty}_{x1}}{dutycycle_{x1}}+\frac{\text{duty}_{x2}}{dutycycle_{x2}}+\ldots+\frac{\text{duty}_{xn}}{dutycycle_{xn}}\right)\le \text{CA\_dutycycle},$$

where n is the number of active carrier frequency bands, xn is an $n^{th}$ active carrier frequency band, $\text{duty}_{xn}$ is an actual uplink sending time duty cycle of the terminal in the nactive carrier frequency band, $\text{dutycycle}_{xn}$ is a capability of a maximum uplink sending time duty cycle that is supported by the terminal in the $n^{th}$ active carrier frequency band, and CA_dutycycle is the capability of the maximum uplink sending time duty cycle that is supported by the terminal in the carrier frequency band combination corresponding to the multiple carrier frequency bands.

Optionally, in a case that maximum transmit power supported by a target active carrier frequency band is higher than preset power, a capability of a maximum uplink sending time duty cycle that is supported by the terminal in the target active carrier frequency band is a first preset value; or in a case that maximum transmit power supported by a target active carrier frequency band is lower than or equal to preset power, a capability of a maximum uplink sending time duty cycle that is supported by the terminal in the target active carrier frequency band is a second preset value, where the target active carrier frequency band is any one of active carrier frequency bands corresponding to the multi-carrier aggregation.

Optionally, in a case that the terminal does not report the capability of the maximum uplink sending time duty cycle that is supported by the terminal in the carrier frequency band combination corresponding to the multiple carrier frequency bands, the capability of the maximum uplink sending time duty cycle that is supported by the terminal in the carrier frequency band combination corresponding to the multiple carrier frequency bands is a first default value; or in a case that maximum transmit power supported in the active carrier frequency band is lower than or equal to preset power, the terminal does not report the capability of the maximum uplink sending time duty cycle that is supported by the terminal in the carrier frequency band combination corresponding to the multiple carrier frequency bands, and the capability of the maximum uplink sending time duty cycle that is supported by the terminal in the carrier frequency band combination corresponding to the multiple carrier frequency bands is a second default value.

Optionally, the terminal is a terminal whose transmit power is higher than preset power.

It should be noted that the multi-carrier communication control method provided in this embodiment of this application is performed by the terminal and corresponds to the multi-carrier communication control method performed by the network-side device in FIG. 2. For a specific implementation process of the method in this embodiment of this application, refer to the detailed description in the method embodiment in FIG. 2. To avoid repetition, details are not described herein again.

It should be noted that the multi-carrier communication control method provided in this embodiment of this application may be performed by a multi-carrier communication control apparatus, or a control module configured to perform the multi-carrier communication control method in the multi-carrier communication control apparatus. A multi-carrier communication control apparatus provided in an embodiment of this application is described by assuming that the multi-carrier communication control method in this embodiment of this application is performed by the multi-carrier communication control apparatus.

FIG. 4 is a structural diagram of a multi-carrier communication control apparatus according to an embodiment of this application. As shown in FIG. 4, the multi-carrier communication control apparatus 400 includes:

an obtaining module 401, configured to: in a case that a terminal is in multi-carrier aggregation or a supplementary uplink, obtain a capability of a maximum uplink sending time duty cycle that is supported by the terminal in each active carrier frequency band and a capability of a maximum uplink sending time duty cycle that is supported by the terminal in a carrier frequency band combination corresponding to multiple carrier frequency bands; and an adjustment module 402, configured to adjust an actual uplink sending time of the terminal in each active carrier frequency band to obtain an actual uplink sending time duty cycle of the terminal in each active carrier frequency band, so that the actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy a preset relationship.

Optionally, the preset relationship is:

$$\frac{1}{n}\times\left(\frac{\text{duty}_{x1}}{dutycycle_{x1}}+\frac{\text{duty}_{x2}}{dutycycle_{x2}}+\ldots+\frac{\text{duty}_{xn}}{dutycycle_{xn}}\right)\le \text{CA\_dutycycle},$$

where n is the number of active carrier frequency bands, xn is an $n^{th}$ active carrier frequency band, $\text{duty}^{xn}$ is an actual uplink sending time duty cycle of the terminal in the $n^{th}$ active carrier frequency band, $\text{dutycycle}^{xn}$ is a capability of a maximum uplink sending time duty cycle that is supported by the terminal in the nth active carrier frequency band, and CA_dutycycle is the capability of the maximum uplink sending time duty cycle that is supported by the terminal in the carrier frequency band combination corresponding to the multiple carrier frequency bands.

Optionally, in a case that maximum transmit power supported by a target active carrier frequency band is higher than preset power, a capability of a maximum uplink sending time duty cycle that is supported by the terminal in the target active carrier frequency band is a first preset value; or in a case that maximum transmit power supported by a target active carrier frequency band is lower than or equal to preset power, a capability of a maximum uplink sending time duty cycle that is supported by the terminal in the target active carrier frequency band is a second preset value, where the target active carrier frequency band is any one of active carrier frequency bands corresponding to the multi-carrier aggregation.

Optionally, in a case that the terminal does not report the capability of the maximum uplink sending time duty cycle that is supported by the terminal in the carrier frequency band combination corresponding to the multiple carrier frequency bands, the capability of the maximum uplink sending time duty cycle that is supported by the terminal in the carrier frequency band combination corresponding to the multiple carrier frequency bands is a first default value; or in a case that maximum transmit power supported in the active carrier frequency band is lower than or equal to preset power, the capability of the maximum uplink sending time duty cycle that is supported by the terminal in the carrier frequency band combination corresponding to the multiple carrier frequency bands is a second default value.

Optionally, the terminal is a terminal whose transmit power is higher than preset power.

In this embodiment of this application, in a case that the terminal is in the multi-carrier aggregation, the apparatus can adjust the actual uplink sending time of the terminal in each active carrier frequency band to obtain the actual uplink sending time duty cycle of the terminal in each active carrier frequency band, so that the actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy the preset relationship, thereby ensuring that overall radiation does not exceed a standard when the terminal performs simultaneous transmission in the multiple active carrier frequency bands.

The multi-carrier communication control apparatus provided in this embodiment of this application can implement each process of the foregoing method embodiment in FIG. 2, with the same technical effect achieved. To avoid repetition, details are not described herein again.

FIG. 5 is a structural diagram of another multi-carrier communication control apparatus according to an embodiment of this application. As shown in FIG. 5, the multi-carrier communication control apparatus 500 includes:

a reporting module 501, configured to: in a case that the apparatus is in multi-carrier aggregation or a supplementary uplink, report, to a network-side device, a capability of a maximum uplink sending time duty cycle that is supported by the apparatus in each active carrier frequency band and a capability of a maximum uplink sending time duty cycle that is supported by the apparatus in a carrier frequency band combination corresponding to multiple carrier frequency bands, where an actual uplink sending time duty cycle of the apparatus in each active carrier frequency band, the capability of the maximum uplink sending time duty cycle that is supported by the apparatus in each active carrier frequency band, and the capability of the maximum uplink sending time duty cycle that is supported by the apparatus in the carrier frequency band combination corresponding to the multiple carrier frequency bands satisfy a preset relationship.

Optionally, the multi-carrier communication control apparatus 500 further includes:

a power adjustment module, configured to reduce transmit power in the active carrier frequency band in a case that the actual uplink sending time duty cycle of the apparatus in each active carrier frequency band, the capability of the maximum uplink sending time duty cycle that is supported by the apparatus in each active carrier frequency band, and the capability of the maximum uplink sending time duty cycle that is supported by the apparatus in the carrier frequency band combination corresponding to the multiple carrier frequency bands do not satisfy the preset relationship.

Optionally, the preset relationship is:

$$\frac{1}{n}\times\left(\frac{\text{duty}_{x1}}{dutycycle_{x1}}+\frac{\text{duty}_{x2}}{dutycycle_{x2}}+\ldots+\frac{\text{duty}_{xn}}{dutycycle_{xn}}\right)\leq \text{CA\_dutycycle},$$

where n is the number of active carrier frequency bands, xn is an $n^{th}$ active carrier frequency band, $\text{duty}^{xn}$ is an actual uplink sending time duty cycle of the apparatus in the $n^{th}$ active carrier frequency band, $\text{dutycycle}_{xn}$ is a capability of a maximum uplink sending time duty cycle that is supported by the apparatus in the $n^{th}$ active carrier frequency band, and CA_dutycycle is the capability of the maximum uplink sending time duty cycle that is supported by the apparatus in the carrier frequency band combination corresponding to the multiple carrier frequency bands.

Optionally, in a case that maximum transmit power supported by a target active carrier frequency band is higher than preset power, a capability of a maximum uplink sending time duty cycle that is supported by the apparatus in the target active carrier frequency band is a first preset value; or in a case that maximum transmit power supported by a target active carrier frequency band is lower than or equal to preset power, a capability of a maximum uplink sending time duty cycle that is supported by the apparatus in the target active carrier frequency band is a second preset value, where the target active carrier frequency band is any one of active carrier frequency bands corresponding to the multi-carrier aggregation.

Optionally, in a case that the apparatus does not report the capability of the maximum uplink sending time duty cycle that is supported by the apparatus in the carrier frequency band combination corresponding to the multiple carrier frequency bands, the capability of the maximum uplink sending time duty cycle that is supported by the apparatus in the carrier frequency band combination corresponding to the multiple carrier frequency bands is a first default value; or in a case that maximum transmit power supported in the active carrier frequency band is lower than or equal to preset power, the apparatus does not report the capability of the maximum uplink sending time duty cycle that is supported by the apparatus in the carrier frequency band combination corresponding to the multiple carrier frequency bands, and the capability of the maximum uplink sending time duty cycle that is supported by the apparatus in the carrier frequency band combination corresponding to the multiple carrier frequency bands is a second default value.

Optionally, the apparatus is an apparatus whose transmit power is higher than preset power.

In this embodiment of this application, the apparatus can report, to the network-side device, the capability of the maximum uplink sending time duty cycle that is supported by the apparatus in each active carrier frequency band and the capability of the maximum uplink sending time duty cycle that is supported by the apparatus in the carrier frequency band combination corresponding to the multiple carrier frequency bands; and after the network-side device receives the two parameters reported by the apparatus, the network-side device can adjust the actual uplink sending time of the apparatus in each active carrier frequency band to obtain the actual uplink sending time duty cycle of the apparatus in each active carrier frequency band, so that the actual uplink sending time duty cycle of the apparatus in each active carrier frequency band, the capability of the maximum uplink sending time duty cycle that is supported by the apparatus in each active carrier frequency band, and the capability of the maximum uplink sending time duty cycle that is supported by the apparatus in the carrier frequency band combination corresponding to the multiple carrier frequency bands satisfy the preset relationship. Therefore, when the apparatus performs simultaneous transmission in the multiple active carrier frequency bands, overall radiation does not exceed a standard.

The multi-carrier communication control apparatus in this embodiment of this application may be an apparatus, or an apparatus or an electronic device with an operating system, or may be a component, an integrated circuit, or a chip in the terminal. The apparatus or the electronic device may be a mobile terminal, or may be a nonmobile terminal. For example, the mobile terminal may include but is not limited to the foregoing illustrated type of the terminal 11. The nonmobile terminal may be a server, a network attached storage (NAS), a personal computer (PC), a television (TV), a teller machine, a self-service machine, or the like. This is not specifically limited in this embodiment of this application.

The multi-carrier communication control apparatus provided in this embodiment of this application can implement each process of the foregoing method embodiment in FIG. 3, with the same technical effect achieved. To avoid repetition, details are not described herein again.

Figure 6:
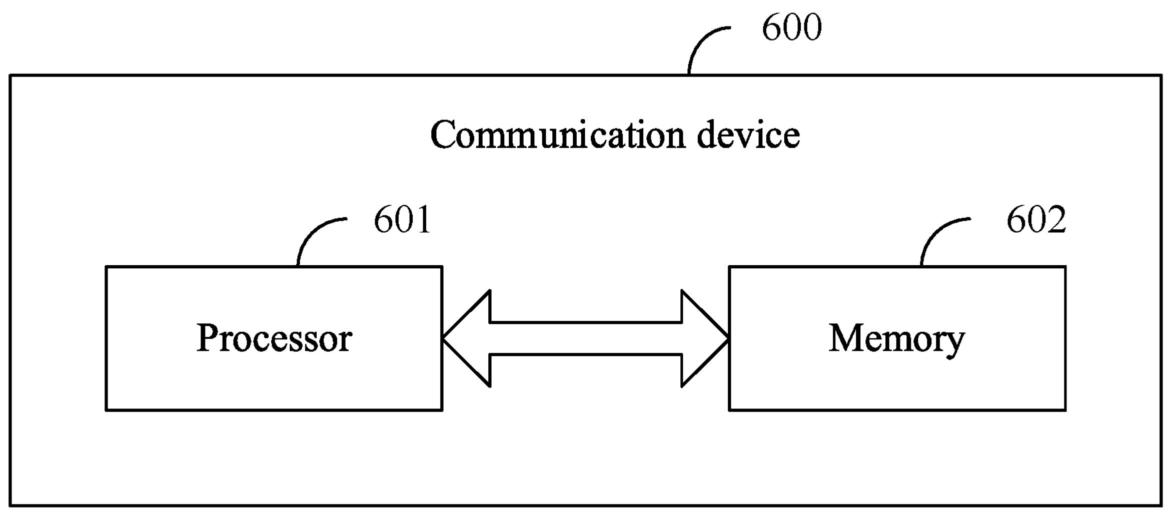
FIG. 6 is a structural diagram of a communication device according to an embodiment of this application.

Optionally, as shown in FIG. 6, an embodiment of this application further provides a communication device 600, including a processor 601, a memory 602, and a program or instructions stored in the memory 602 and capable of running on the processor 601. For example, when the communication device 600 is a terminal, and the program or instructions are executed by the processor 601, each process of the foregoing embodiment of the multi-carrier communication control method in FIG. 3 is implemented, with the same technical effect achieved. When the communication device 600 is a network-side device, and the program or instructions are executed by the processor 601, each process of the foregoing embodiment of the multi-carrier communication control method in FIG. 2 is implemented, with the same technical effect achieved. To avoid repetition, details are not described herein again.

Figure 7:
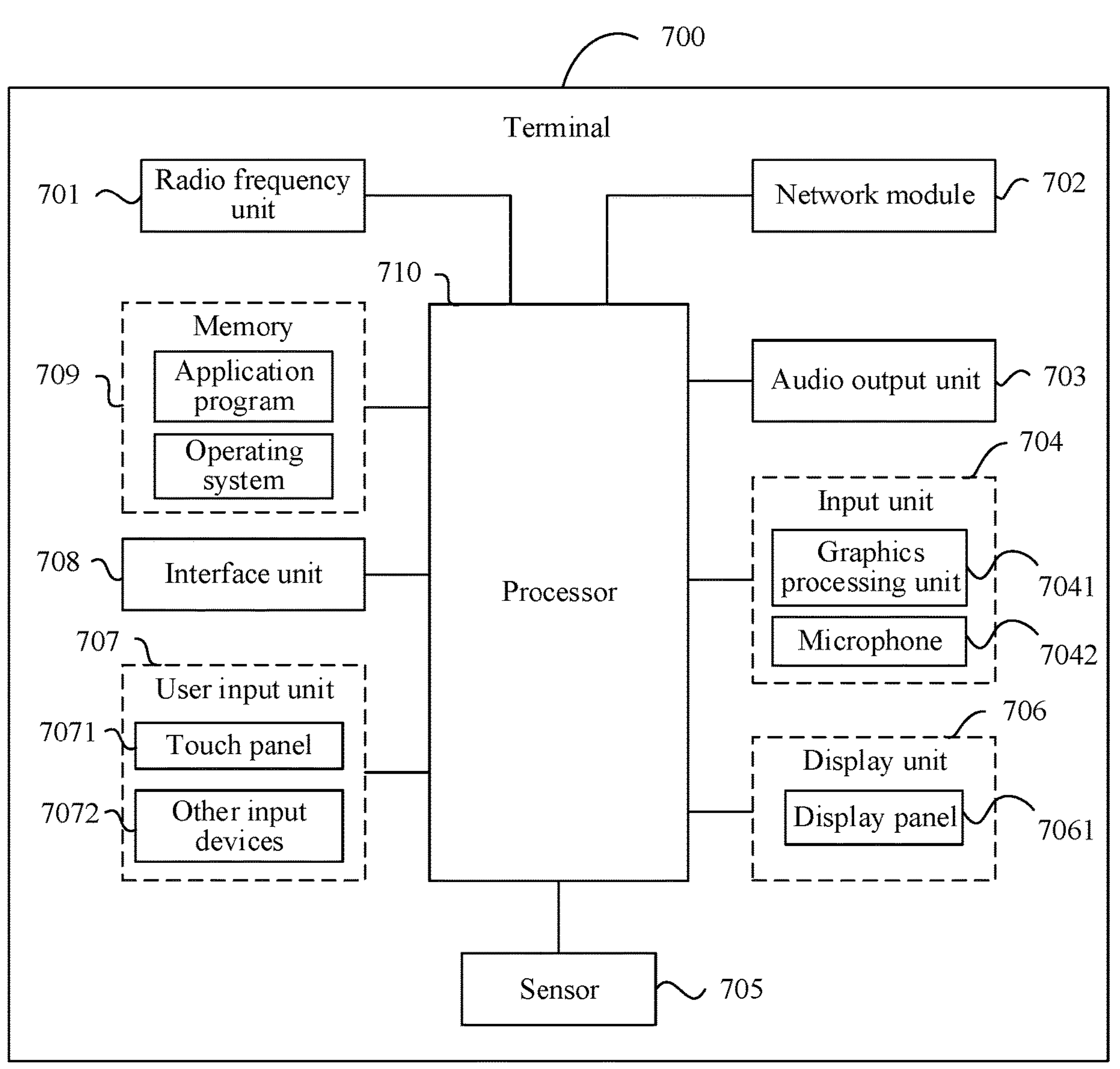
FIG. 7 is a structural diagram of a terminal according to an embodiment of this application.

An embodiment of this application further provides a terminal, including a processor and a communication interface. The communication interface is configured to: in a case that the terminal is in multi-carrier aggregation or a supplementary uplink, report, to a network-side device, a capability of a maximum uplink sending time duty cycle that is supported by the terminal in each active carrier frequency band and a capability of a maximum uplink sending time duty cycle that is supported by the terminal in a carrier frequency band combination corresponding to multiple carrier frequency bands. The terminal embodiment corresponds to the foregoing terminal-side method embodiment, and each implementation process and implementation of the foregoing method embodiment can be applied to the terminal embodiment, with the same technical effect achieved. Specifically, FIG. 7 is a schematic diagram of a hardware structure of a terminal for implementing an embodiment of this application.

The terminal 700 includes but is not limited to at least some components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the terminal 700 may further include a power supply (for example, a battery) supplying power to all components. Optionally, the power supply may be logically connected to the processor 710 through a power management system. In this way, functions such as charge management, discharge management, and power consumption management are implemented by using the power management system. The terminal structure shown in FIG. 7 does not constitute a limitation on the terminal. The terminal may include more or fewer components than those shown in the figure, or some components are combined, or component arrangements are different. Details are not described herein again.

It should be understood that, in this embodiment of this application, the input unit 704 may include a graphics processing unit (GPU) 7041 and a microphone 7042. The graphics processing unit 7041 processes image data of a still picture or video obtained by an image capture apparatus (such as a camera) in a video capture mode or an image capture mode. The display unit 706 may include a display panel 7061, and the display panel 7061 may be configured in a form of a liquid crystal display, an organic light-emitting diode, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function key (such as a volume control button or a power button), a trackball, a mouse, and a joystick. Details are not described herein again.

In this embodiment of this application, after receiving downlink data from a network-side device, the radio frequency unit 701 sends the downlink data to the processor 710 for processing, and in addition, sends uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions and various data. The memory 709 may primarily include a program or instruction storage area and a data storage area. The program or instruction storage area may store an operating system, an application program or an instruction (such as an audio play function and an image play function) required by at least one function, and the like. In addition, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 710 may include one or more processing units. Optionally, the processor 710 may integrate an application processor and a modem processor. The application processor mainly processes the operating system, a user interface, an application program or an instruction, and the like. The modem processor mainly processes wireless communication. For example, the modem processor is a baseband processor. It may be understood that the modem processor may alternatively not be integrated in the processor 710.

The radio frequency unit 701 is configured to: in a case that the terminal is in multi-carrier aggregation or a supplementary uplink, report, to the network-side device, a capability of a maximum uplink sending time duty cycle that is supported by the terminal in each active carrier frequency band and a capability of a maximum uplink sending time duty cycle that is supported by the terminal in a carrier frequency band combination corresponding to multiple carrier frequency bands, where an actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy a preset relationship.

Optionally, the processor 710 is configured to reduce transmit power in the active carrier frequency band in a case that the actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands do not satisfy the preset relationship.

Optionally, the preset relationship is:

$$\frac{1}{n}\times\left(\frac{\text{duty}_{x1}}{dutycycle_{x1}}+\frac{\text{duty}_{x2}}{dutycycle_{x2}}+\ldots+\frac{\text{duty}_{xn}}{dutycycle_{xn}}\right)\leq \text{CA\_dutycycle},$$

where n is the number of active carrier frequency bands, xn is an $n^{th}$ active carrier frequency band, $\text{duty}_{xn}$ is an actual uplink sending time duty cycle of the terminal in the $n^{th}$ active carrier frequency band, $\text{dutycycle}_{xn}$ is a capability of a maximum uplink sending time duty cycle that is supported by the terminal in the $n^{th}$ active carrier frequency band, and CA_dutycycle is the capability of the maximum uplink sending time duty cycle that is supported by the terminal in the carrier frequency band combination corresponding to the multiple carrier frequency bands.

Optionally, in a case that maximum transmit power supported by a target active carrier frequency band is higher than preset power, a capability of a maximum uplink sending time duty cycle that is supported by the terminal in the target active carrier frequency band is a first preset value; or in a case that maximum transmit power supported by a target active carrier frequency band is lower than or equal to preset power, a capability of a maximum uplink sending time duty cycle that is supported by the terminal in the target active carrier frequency band is a second preset value, where the target active carrier frequency band is any one of active carrier frequency bands corresponding to the multi-carrier aggregation.

Optionally, in a case that the terminal does not report the capability of the maximum uplink sending time duty cycle that is supported by the terminal in the carrier frequency band combination corresponding to the multiple carrier frequency bands, the capability of the maximum uplink sending time duty cycle that is supported by the terminal in the carrier frequency band combination corresponding to the multiple carrier frequency bands is a first default value; or in a case that maximum transmit power supported in the active carrier frequency band is lower than or equal to preset power, the terminal does not report the capability of the maximum uplink sending time duty cycle that is supported by the terminal in the carrier frequency band combination corresponding to the multiple carrier frequency bands, and the capability of the maximum uplink sending time duty cycle that is supported by the terminal in the carrier frequency band combination corresponding to the multiple carrier frequency bands is a second default value.

Optionally, the terminal is a terminal whose transmit power is higher than preset power.

In this embodiment of this application, in a case that the terminal is in the multi-carrier aggregation, the terminal can report, to the network-side device, the capability of the maximum uplink sending time duty cycle that is supported by the terminal in each active carrier frequency band and the capability of the maximum uplink sending time duty cycle that is supported by the terminal in the carrier frequency band combination corresponding to the multiple carrier frequency bands; and after the network-side device receives the two parameters reported by the terminal, the network-side device can adjust the actual uplink sending time of the terminal in each active carrier frequency band to obtain the actual uplink sending time duty cycle of the terminal in each active carrier frequency band, so that the actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy the preset relationship. Therefore, when the terminal performs simultaneous transmission in the multiple active carrier frequency bands, overall radiation does not exceed a standard.

An embodiment of this application further provides a network-side device, including a processor and a communication interface. The processor is configured to: in a case that a terminal is in multi-carrier aggregation or a supplementary uplink, obtain a capability of a maximum uplink sending time duty cycle that is supported by the terminal in each active carrier frequency band and a capability of a maximum uplink sending time duty cycle that is supported by the terminal in a carrier frequency band combination corresponding to multiple carrier frequency bands; and adjust an actual uplink sending time of terminal in each active carrier frequency band to obtain an actual uplink sending time duty cycle of the terminal in each active carrier frequency band, so that the actual uplink sending time duty cycle of the terminal in each active carrier frequency band, the capability of the maximum uplink sending time duty cycle that is supported by the terminal in each active carrier frequency band, and the capability of the maximum uplink sending time duty cycle that is supported by the terminal in the carrier frequency band combination corresponding to the multiple carrier frequency bands satisfy a preset relationship. The network-side device embodiment corresponds to the foregoing method embodiment of the network-side device, and each implementation process and implementation of the foregoing method embodiment can be applied to the network-side device embodiment, with the same technical effect achieved.

Figure 8:
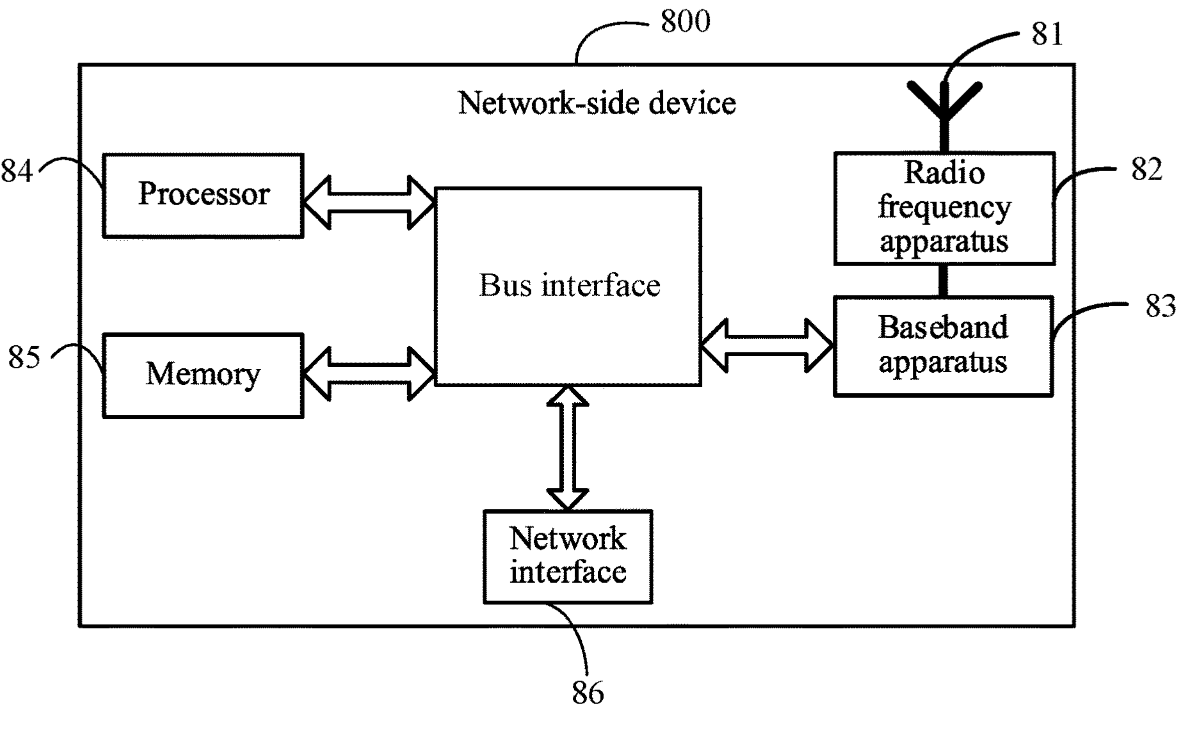
FIG. 8 is a structural diagram of a network-side device according to an embodiment of this application.

Specifically, an embodiment of this application further provides a network-side device. As shown in FIG. 8, the network-side device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and sends the received information to the baseband apparatus 83 for processing. In a downlink direction, the baseband apparatus 83 processes to-be-sent information, and sends the information to the radio frequency apparatus 82; and the radio frequency apparatus 82 processes the received information and then sends the information out by using the antenna 81.

The radio frequency apparatus may be located in the baseband apparatus 83. The method performed by the network-side device in the foregoing embodiment may be implemented in the baseband apparatus 83, and the baseband apparatus 83 includes a processor 84 and a memory 85.

The baseband apparatus 83 may include, for example, at least one baseband processing unit, where a plurality of chips are disposed on the baseband processing unit. As shown in FIG. 8, one of the chips is, for example, the processor 84, connected to the memory 85, to invoke a program in the memory 85 to perform the operation of the network device shown in the foregoing method embodiment.

The baseband apparatus 83 may further include a network interface 86, configured to exchange information with the radio frequency apparatus 82, where the interface is, for example, a common public radio interface (CPRI).

Specifically, the network-side device in this embodiment of this application further includes a program or instructions stored in the memory 85 and capable of running on the processor 84. When the processor 84 invokes the program or instructions in the memory 85, the method performed by each module shown in FIG. 4 is performed, with the same technical effect achieved. To avoid repetition, details are not described herein again.

An embodiment of this application further provides a readable storage medium. The readable storage medium stores a program or instructions. When the program or instructions are executed by a processor, each process of the foregoing embodiment of the multi-carrier communication control method in FIG. 2 is implemented, or each process of the foregoing embodiment of the multi-carrier communication control method in FIG. 3 is implemented, with the same technical effect achieved. To avoid repetition, details are not described herein again.

The processor is a processor in the terminal in the foregoing embodiment. The readable storage medium includes a computer-readable storage medium, for example, a computer read-only memory (ROM), a random access memory (RAM), a magnetic disk, or an optical disc.

In addition, an embodiment of this application provides a chip. The chip includes a processor and a communication interface. The communication interface is coupled to the processor. The processor is configured to run a program or instructions to implement each process of the foregoing embodiment of the multi-carrier communication control method in FIG. 2 or each process of the foregoing embodiment of the multi-carrier communication control method in FIG. 3, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A multi-carrier communication control method, comprising:

obtaining, by a network-side device, a capability of a maximum uplink sending time duty cycle that is supported by a terminal in each carrier frequency band and a capability of a maximum uplink sending time duty cycle that is supported by the terminal in a carrier frequency band combination corresponding to multiple carrier frequency bands, wherein the multi-carrier aggregation or a supplementary uplink is supported by the terminal; and adjusting, by the network-side device, an actual uplink sending time of the terminal in each carrier frequency band to obtain an actual uplink sending time duty cycle of the terminal in each carrier frequency band, so that the actual uplink sending time duty cycle of the terminal in each carrier frequency band, the capability of the maximum uplink sending time duty cycle that is supported by the terminal in each carrier frequency band, and the capability of the maximum uplink sending time duty cycle that is supported by the terminal in the carrier frequency band combination corresponding to the multiple carrier frequency bands satisfy a preset relationship, and wherein the preset relationship is:

$$\frac{1}{n}\times\left(\frac{duty_{x1}}{dutycycle_{x1}}+\frac{duty_{x2}}{dutycycle_{x2}}+\ldots+\frac{duty_{xn}}{dutycycle_{xn}}\right)\leq \text{CA\_dutycycle},$$

wherein n is the number of carrier frequency bands, xn is an $n^{th}$ carrier frequency band, $duty_{xn}$ is an actual uplink sending time duty cycle of the terminal in the $n^{th}$ carrier frequency band, $dutycycle_{xn}$ is a capability of a maximum uplink sending time duty cycle that is supported by the terminal in the $n^{th}$ carrier frequency band, and CA_dutycycle is the capability of the maximum uplink sending time duty cycle that is supported by the terminal in the carrier frequency band combination corresponding to the multiple carrier frequency bands.

2. The method according to claim 1, wherein in a case that maximum transmit power supported by a target carrier frequency band is higher than preset power, a capability of a maximum uplink sending time duty cycle that is supported by the terminal in the target carrier frequency band is a first preset value; or in a case that maximum transmit power supported by a target carrier frequency band is lower than or equal to preset power, a capability of a maximum uplink sending time duty cycle that is supported by the terminal in the target carrier frequency band is a second preset value, wherein the target carrier frequency band is any one of carrier frequency bands corresponding to the multi-carrier aggregation.

3. The method according to claim 1, wherein in a case that the terminal does not report the capability of the maximum uplink sending time duty cycle that is supported by the terminal in the carrier frequency band combination corresponding to the multiple carrier frequency bands, the capability of the maximum uplink sending time duty cycle that is supported by the terminal in the carrier frequency band combination corresponding to the multiple carrier frequency bands is a first default value; or in a case that maximum transmit power supported in the carrier frequency band is lower than or equal to preset power, the capability of the maximum uplink sending time duty cycle that is supported by the terminal in the carrier frequency band combination corresponding to the multiple carrier frequency bands is a second default value.

4. The method according to claim 1, wherein the terminal is a terminal whose transmit power is higher than preset power.

5. A multi-carrier communication control method, comprising:

reporting, by a terminal to a network-side device, a capability of a maximum uplink sending time duty cycle that is supported by the terminal in each carrier frequency band and a capability of a maximum uplink sending time duty cycle that is supported by the terminal in a carrier frequency band combination corresponding to multiple carrier frequency bands, wherein the multi-carrier aggregation or a supplementary uplink is supported by the terminal, and wherein an actual uplink sending time duty cycle of the terminal in each carrier frequency band, the capability of the maximum uplink sending time duty cycle that is supported by the terminal in each carrier frequency band, and the capability of the maximum uplink sending time duty cycle that is supported by the terminal in the carrier frequency band combination corresponding to the multiple carrier frequency bands satisfy a preset and wherein the preset relationship is:

$$\frac{1}{n}\times\left(\frac{duty_{x1}}{dutycycle_{x1}}+\frac{duty_{x2}}{dutycycle_{x2}}+\ldots+\frac{duty_{xn}}{dutycycle_{xn}}\right)\leq \text{CA\_dutycycle},$$

wherein n is the number of carrier frequency bands, xn is an $n^{th}$ carrier frequency band, $duty_{xn}$ is an actual uplink sending time duty cycle of the terminal in the $n^{th}$ carrier frequency band, $dutycycle_{xn}$ is a capability of a maximum uplink sending time duty cycle that is supported by the terminal in the $n^{th}$ carrier frequency band, and CA_dutycycle is the capability of the maximum uplink sending time duty cycle that is supported by the terminal in the carrier frequency band combination corresponding to the multiple carrier frequency bands.

6. The method according to claim 5, wherein the method further comprises:

in a case that the actual uplink sending time duty cycle of the terminal in each carrier frequency band, the capability of the maximum uplink sending time duty cycle that is supported by the terminal in each carrier frequency band, and the capability of the maximum uplink sending time duty cycle that is supported by the terminal in the carrier frequency band combination corresponding to the multiple carrier frequency bands do not satisfy the preset relationship, reducing, by the terminal, transmit power in the carrier frequency band.

7. The method according to claim 5, wherein in a case that maximum transmit power supported by a target carrier frequency band is higher than preset power, a capability of a maximum uplink sending time duty cycle that is supported by the terminal in the target carrier frequency band is a first preset value; or in a case that maximum transmit power supported by a target carrier frequency band is lower than or equal to preset power, a capability of a maximum uplink sending time duty cycle that is supported by the terminal in the target carrier frequency band is a second preset value, wherein the target carrier frequency band is any one of carrier frequency bands corresponding to the multi-carrier aggregation.

8. The method according to claim 5, wherein in a case that the terminal does not report the capability of the maximum uplink sending time duty cycle that is supported by the terminal in the carrier frequency band combination corresponding to the multiple carrier frequency bands, the capability of the maximum uplink sending time duty cycle that is supported by the terminal in the carrier frequency band combination corresponding to the multiple carrier frequency bands is a first default value; or in a case that maximum transmit power supported in the carrier frequency band is lower than or equal to preset power, the terminal does not report the capability of the maximum uplink sending time duty cycle that is supported by the terminal in the carrier frequency band combination corresponding to the multiple carrier frequency bands, and the capability of the maximum uplink sending time duty cycle that is supported by the terminal in the carrier frequency band combination corresponding to the multiple carrier frequency bands is a second default value.

9. The method according to claim 5, wherein the terminal is a terminal whose transmit power is higher than preset power.

10. A network-side device, comprising a processor, a memory, and a program or instructions stored in the memory and capable of running on the processor, wherein the program or the instructions, when executed by the processor, causes the processor to perform:

obtaining a capability of a maximum uplink sending time duty cycle that is supported by the terminal in each carrier frequency band and a capability of a maximum uplink sending time duty cycle that is supported by the terminal in a carrier frequency band combination corresponding to multiple carrier frequency bands, wherein the multi-carrier aggregation or a supplementary uplink is supported by the terminal; and adjusting an actual uplink sending time of the terminal in each carrier frequency band to obtain an actual uplink sending time duty cycle of the terminal in each carrier frequency band, so that the actual uplink sending time duty cycle of the terminal in each carrier frequency band, the capability of the maximum uplink sending time duty cycle that is supported by the terminal in each carrier frequency band, and the capability of the maximum uplink sending time duty cycle that is supported by the terminal in the carrier frequency band combination corresponding to the multiple carrier frequency bands satisfy a preset relationship, and wherein the preset relationship is:

$$\frac{1}{n}\times\left(\frac{duty_{x1}}{dutycycle_{x1}}+\frac{duty_{x2}}{dutycycle_{x2}}+\ldots+\frac{duty_{xn}}{dutycycle_{xn}}\right)\leq \text{CA\_dutycycle},$$

wherein n is the number of carrier frequency bands, xn is an $n^{th}$ carrier frequency band, $duty_{xn}$ is an actual uplink sending time duty cycle of the terminal in the $n^{th}$ carrier frequency band, $dutycycle_{xn}$ is a capability of a maximum uplink sending time duty cycle that is supported by the terminal in the $n^{th}$ carrier frequency band, and CA_dutycycle is the capability of the maximum uplink sending time duty cycle that is supported by the terminal in the carrier frequency band combination corresponding to the multiple carrier frequency bands.

11. The network-side device according to claim 10, wherein in a case that maximum transmit power supported by a target carrier frequency band is higher than preset power, a capability of a maximum uplink sending time duty cycle that is supported by the terminal in the target carrier frequency band is a first preset value; or in a case that maximum transmit power supported by a target carrier frequency band is lower than or equal to preset power, a capability of a maximum uplink sending time duty cycle that is supported by the terminal in the target carrier frequency band is a second preset value, wherein the target carrier frequency band is any one of carrier frequency bands corresponding to the multi-carrier aggregation.

12. The network-side device according to claim 10, wherein in a case that the terminal does not report the capability of the maximum uplink sending time duty cycle that is supported by the terminal in the carrier frequency band combination corresponding to the multiple carrier frequency bands, the capability of the maximum uplink sending time duty cycle that is supported by the terminal in the carrier frequency band combination corresponding to the multiple carrier frequency bands is a first default value; or in a case that maximum transmit power supported in the carrier frequency band is lower than or equal to preset power, the capability of the maximum uplink sending time duty cycle that is supported by the terminal in the carrier frequency band combination corresponding to the multiple carrier frequency bands is a second default value.

13. The network-side device according to claim 10, wherein the terminal is a terminal whose transmit power is higher than preset power.

* * * * *